United States Patent [19]
Kalsi

[11] 4,147,183
[45] Apr. 3, 1979

[54] VALVE USING ROLAMITE MECHANISM

[75] Inventor: Manmohan S. Kalsi, Houston, Tex.

[73] Assignee: ACF Industries, Incorporated, New York, N.Y.

[21] Appl. No.: 862,087

[22] Filed: Dec. 19, 1977

[51] Int. Cl.$^2$ ............................................. F16K 13/00
[52] U.S. Cl. ........................ 137/625.28; 251/DIG. 2
[58] Field of Search ...................... 137/DIG.2, 625.28

[56] References Cited

U.S. PATENT DOCUMENTS

| | | | |
|---|---|---|---|
| 212,556 | 2/1879 | Johnson | 251/DIG. 2 |
| 3,726,313 | 4/1973 | Pandya | 251/DIG. 2 |
| 3,794,068 | 2/1974 | Milroy | 251/DIG. 2 |
| 4,084,617 | 4/1978 | Happe | 137/625.28 |

Primary Examiner—Arnold Rosenthal
Attorney, Agent, or Firm—Eugene N. Riddle

[57] ABSTRACT

A curtain valve has a valve chamber having a pair of opposed walls with an inlet port through one wall and an outlet port through the other wall. A valve member has a tension band supported on opposite ends thereof in a valve body with the band being looped around a pair of rollers forming a pair of bights which partially encircle the rollers. The tension band is perforated on the end portion which overlies the inlet port. A stem is connected to one of the rollers and extends from the valve body for displacing the rollers and moving the tension band to cover and uncover the outlet port thereby closing and opening the valve.

8 Claims, 4 Drawing Figures

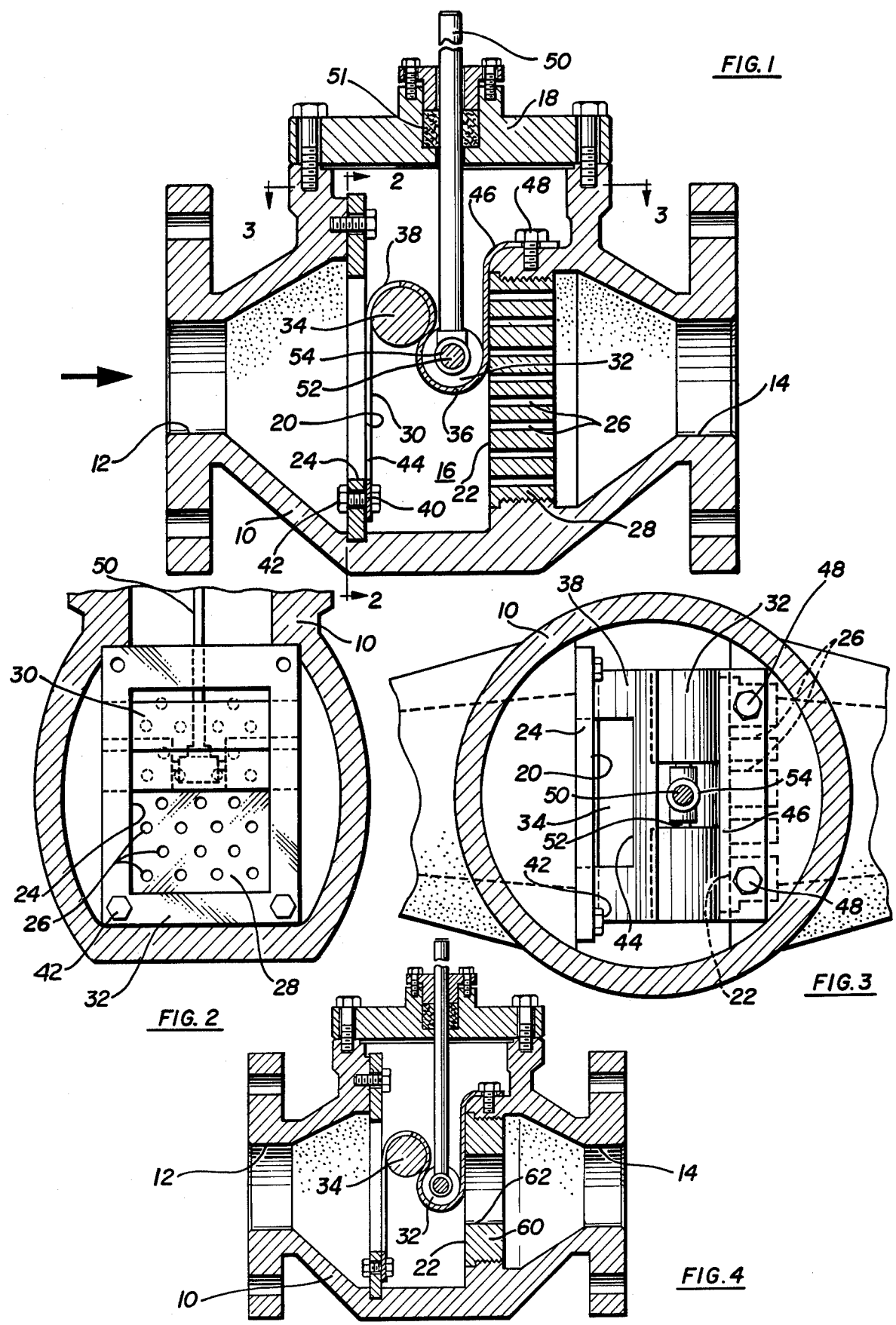

VALVE USING ROLAMITE MECHANISM

BACKGROUND OF THE INVENTION

This invention is related to so-called curtain valves wherein the valve member is a flexible element that can be displaced over a passageway inside of a valve to control the fluid flow through the valve. More particularly this invention is related to curtain valves wherein the valve element is supported and displaced by the motion of rollers.

In the art relating to curtain valves, the valve constructions follow several general configurations. In one of these configurations exemplified by Barneby, U.S. Pat. No. 3,828,816 issued Aug. 13, 1974, the flexible valve element is an impervious sheet mounted between reels at opposite ends of a grid so the sheet can slide across the grid as the reels are rotated. Another general configuration exemplified by Burdock, U.S. Pat. No. 3,410,311 issued Nov. 12, 1968, has flexible valve member secured at one edge of a port and extending thereform around a roller to a take-up reel which stores the unused portion of the flexible member. The roller moves across the part and pulls the valve member across the port to close the valve. In another configuration the curtain valve (shown in Fox, U.S. Pat. No. 3,905,576 issued Sept. 16, 1975) has a pair of endless bands supported on rollers and arranged in a side by side relation such that one portion of the bands resides in a face-to-face relation and outer portions of the bands face outward to block inlet and outlet parts of the valve.

The disadvantages of the above noted prior art curtain valves are as follows:

In the first configuration and in the second configuration the flexible member must be maintained in sufficient tension in order to prevent the flexible member from fluttering or vibrating excessively in the fluid flow. A valve of either of these configurations would be most likely restricted to relatively low fluid flow rates due to vibration of the flexible valve member. Also, in these two configurations considerable force may be required on the part of an operator or actuator for the valve in order to precisely position the valve member and restrain it from flow induced forces in the valve.

In the third configuration a large number of parts are required to accomplish the desired result and these must be precisely constructed and kept clean and free to move in order to prevent the valve member from jamming as the rollers move in the up and down motion to open and close the valve.

This invention utilizes a mechanism that is designated as a rolamite. This rolamite mechanism is described in a publication titled "Rolamite: a New Mechanical Design Concept", Research Report SC-RR-67-656A, pages 116, 119, Dec. 1967, D. F. Wilkes, 1322 Sandia Laboratory, Albuquerque, N.M. The rolamite mechanism is also shown as a vibration detector in the Harrah et al, U.S. Pat. No. 3,698,351 issued Oct. 17, 1972.

SUMMARY OF THE INVENTION

In an embodiment, a curtain valve has a tension band supported on opposite ends inside the cavity of a valve body with the band being looped around a pair of rollers thus forming a pair of bights which partially encircle the rollers. The tension band is perforated through the portion which overlies an inlet port to the valve chamber, the tension band is not perforated through the portion which overlies an outlet port from the valve chamber. A stem is rotatably mounted with the roller that is closest to the outlet port. The stem extends through the valve body and is used for displacing the tension band across the outlet port.

One object of this invention is to provide a curtain valve structure overcoming the aforementioned disadvantages of the prior art devices.

Still, one other object of this invention is to provide a curtain valve structure having a tension band which is looped around a pair of rollers forming a pair of bights partially encircling the rollers similar to the above mentioned rolamite mechanism.

Still, another object of this invention is to provide a curtain valve structure which has a tension band that can be displaced across an outlet port by a relatively small force and further wherein the outlet port can be a single opening or a plurality of passageways.

Various other objects, advantages, and features of this invention will become apparent to those skilled in the art from the following discussion, taken in conjunction with the accompanying drawing, in which:

DESCRIPTION OF THE DRAWING

FIG. 1 is a cutaway elevation view of a valve having the curtain valve mechanism of this invention wherein the valve is shown displaced to a mid-portion of the outlet port;

FIG. 2 is a sectional view of the inlet port portion of the valve with the view taken on section line 2—2 of FIG. 1;

FIG. 3 is a top view of the valve mechanism taken on section line 3—3 of FIG. 1;

FIG. 4 is a cross-sectional elevation view of the valve shown in FIG. 1 with the outlet port of the valve having an outlet port plug with a single passageway therethrough.

The following is a discussion and description of preferred specific embodiments of the valve structure of this invention, such being made with reference to the drawings, whereupon the same reference numerals are used to indicate the same or similar parts and/or structure. It is to be understood that such discussion and description is not to unduly limit the scope of the invention.

DETAILED DESCRIPTION

FIG. 1 shows a valve employing the curtain valve mechanism of this invention. The valve includes a valve body 10 with an inlet passageway 12, an outlet passageway 14, and a valve chamber 16 that is in fluid communication with the passageways. A bonnet 18 is removably mounted on a top portion of valve body 10. Valve chamber 16 is formed between an inlet wall and an outlet wall. Opposite ends of valve chamber 16 are defined by an inlet wall surface 20 and an outlet wall surface 22. Inlet wall surface 20 is substantially parallel to outlet wall surface 22. An inlet port 24 is provided through the inlet wall and an outlet port is provided through the outlet wall. For the valve configuration shown in FIG. 1 the outlet port includes a plurality of passageways 26 through the outlet wall. Inlet port 24 is generally rectangular in cross-sectional shape. The outlet wall is formed by a portion of the valve body and includes an outlet port plug 28 which is removably mounted in the valve body. Outlet port plug 28 as shown in FIG. 1 is threadedly mounted with the valve body. The inner end surface of this plug coincides with the outlet wall surface 22. Passageways 26 through the outlet port plug provide fluid communication from valve chamber 16 to the outlet passageway 14. Because outlet port plug 28 is removable this provides the opportunity to vary the size and shape of the passageways which form the outlet port in order to suit a particular need.

The valve element of this valve is formed by a specially adapted rolamite mechanism. The valve element includes an elongated tension band 30 which is secured to the valve body inside valve chamber 16 and is looped over a drive roller 32 and a driven roller 34 into a pair of bights which partially encircle the rollers. Rollers 32 and 34 are preferably sized such that the diameter of each of the rollers is greater than one-half (½) the distance between wall surfaces 20 and 22. Sizing of the rollers relative to the distance between surfaces 20 and 22 is important so the rollers 32 and 34 are retained within the respective bights 36 and 38. Surfaces 20 and 22 cannot be farther apart than the sum of the roller diameters plus three (3) times the thickness of tension band 30, otherwise the rollers cannot be retained in place. One end of tension band 30 is secured to what is the lower or bottom end portion of the inlet wall and the opposite end portion of the band is secured to the upper portion of the outlet wall. Tension band 30 is secured across an inlet end portion 40 to inlet wall surface 20 by fasteners 42 at the bottom of the inlet wall below inlet port 24. This tension band inlet end portion 40 is provided with a rectangular shaped opening 44 therethrough which aligns with inlet port 24 as the tension band is positioned over inlet wall surface 20. Tension band 30 has its outlet end portion 46 secured to valve body 10 above the portion which mounts outlet port plug 28 by fasteners 48. It is to be noted that tension band 30 is imperforate except for the rectangular shaped opening 44 which aligns with inlet port 24. Band 30 can be metallic or non-metallic depending on the service of the valve.

A valve step 50 extends through a packing 51 in bonnet 18 and is rotatably mounted with drive roller 32. Drive roller 32 has a pair of cylindrical segments aligned on a common longitudinal axis and connected by a shaft 52 along the common longitudinal axis. Stem 50 is provided with a journal 54 around shaft 52. As stem 50 is displaced in an up and down motion (or an inward and outward motion relative to valve chamber 16) this causes drive roller 32 to rotate which in turn displaces the location of bights 36 and 38 in the tension band and rotates driven roller 32. As the rollers are displaced they simultaneously cover one valve port and uncover the other valve port. With the valve positioned as shown in FIG. 1, fluid flows through inlet passageway 12 and inlet port 24 into the valve chamber 16. Fluid flows from valve chamber 16 around the outside of bight 36 and through the uncovered outlet passageways 26 to outlet passageway 14. As the rollers are displaced upward from the position shown in FIG. 1, tension band 30 uncovers more of the plurality of passageways 26, thus increasing the effective area of the outlet port so fluid flow through the valve can increase. When the rollers are displaced in a downward direction from the position shown in FIG. 1, then tension band 30 will cover more of the passageways 26, thus reducing the effective area of the outlet port which reduces the overall fluid flow through the valve.

In operating this valve it is to be noted that because of the unique relationship of the rollers and the tension band which forms the valve member, this valve can be opened and closed by a relatively small actuation force. A low actuation force for this valve can be attributed to the basic low friction nature of the rollers and the tension band. Because the imperforate portion of the tension band merely lays over or covers outlet wall surface 22, this does not create a friction or drag normally present in valves which have a sliding valve member or in curtain valves where the curtain must slide. One other advantage of the particular tension band and roller arrangement of this invention is that the band remains in nearly constant tension regardless of the position of the rollers and the band remains in contact with the inlet and outlet wall surfaces. Tension band 30 is not free to flutter or vibrate as are the curtain elements in some other curtain valve constructions. The mechanical force necessary to displace stem 50 must only be sufficient to overcome the small forces involved with rotating the rollers, bending tension band 30, and any force necessary to overcome any flow induced forces caused by the increased fluid velocity around bight 36. When the valve member is positioned with tension band 30 overlying all of the passageways in the outlet wall surface 22, then fluid pressure on the upstream side of the tension band urges it into sealing contact with outlet wall surface 22 thereby closing and sealing the valve. When the valve is in a partially open position, as shown in FIG. 1, the portion of tension band 30 which covers some of the outlet passageways 26 seals around these passageways at the outlet wall surface 22; however, a seal with the valve in this condition is not necessary.

FIG. 4 shows the valve described above equipped with a different configuration outlet port plug 60. Outlet port plug 60 is provided with a single passageway 62 therethrough. Passageway 62 is centrally located in the plug and communicates between outlet wall surface 22 and outlet passageway 14. A valve with the single aperture outlet port plug 60 will function the same as the valve described above in regard to motion of the valve member and frictional resistance thereof. Using an outlet port plug with the single passageway 62 may have advantages in services where the fluid may be of a rather thick consistency, contain particulate material, or where a rather coarse flow control is required. Because of the removable outlet port plug feature of the valve body, the outlet port configuration can be varied at the desire of the user by substituting the outlet port plug with one of a different passageway configuration.

What is claimed is:

1. A valve comprising:
    (a) a valve body with inlet and outlet passageways and a valve chamber therebetween;
    (b) said valve chamber having a pair of opposed walls with an inlet port communicating from said inlet passageway through one of said walls and an outlet port through the other one of said walls communicating to said outlet passageway;
    (c) a valve member including an elongated flexible tension band and a pair of rollers with said tension band having opposed end portions thereof secured to said valve body, said tension band lying on facing surfaces of both of said opposed walls and looped into a pair of bights which partially encircle said rollers;
    (d) said facing surfaces of said opposed walls being spaced apart a distance less than the sum of the diameters of said rollers plus three times the thickness of said tension band;

(e) said tension band having an aperture therethrough in the portion which contacts the wall having said inlet port, said tension band being continuous and imperforate in the portion which contacts the wall having said outlet port; and (f) means to displace said rollers operable from the exterior of said valve body such that said tension band continuous portion can be positioned over said outlet port to close the valve, and such that said tension band continuous portion can be positioned to uncover at least a portion of said outlet port to permit at least a limited fluid flow through said valve.

2. The valve of claim 1, wherein:

(a) said facing surfaces are parallel to each other, said walls are generally transverse to the direction of fluid flow between said inlet and outlet passageways; and (b) said tension band aperture is shaped to align with said inlet port.

3. The valve of claim 1, wherein:

(a) said means to displace said rollers has a stem rotatably mounted with one of said rollers and extending from said valve body so that said stem can be coupled with a suitable valve actuator; and (b) said tension band opposed end portions are rigidly secured to said valve body in locations on opposed sides of said valve chamber such that said tension band will lie flat on both of said facing surfaces with said tension band positionable in sealing contact with the surface of said wall having said outlet port.

4. The valve of claim 1, wherein said wall having said outlet port has a removable plug, and said removable plug contains said outlet port.

5. The valve of claim 4, wherein said outlet port through said removable plug is defined by a plurality of passageways through said removable plug.

6. The valve of claim 3, wherein said stem is rotatably mounted with a mid-portion of the roller which is closest to said outlet port.

7. The valve of claim 1, wherein said wall having said inlet port is removably mounted in said valve body.

8. A valve comprising:

(a) a valve body with inlet and outlet passageways and a valve chamber therebetween;

(b) said valve chamber having a pair of opposed internal surfaces with an inlet port through one of said internal surfaces communicating from said inlet passageway and an outlet port through the other one of said internal surfaces communicating to said outlet passageway;

(c) a valve member including an elongated flexible tension band and a pair of rollers wherein said tension band has opposed end portions thereof secured to said valve body and the mid-portion thereof lying on said internal surfaces and looped into a pair of bights which partially encircle said rollers;

(d) said internal surfaces being spaced apart a distance which will prevent said rollers from being displaced from said bights;

(e) said tension band having an aperture therethrough in the portion which contacts the internal surface having said inlet port, said tension band being continuous and imperforate in the portion which contacts the internal surface having said outlet port; and (f) means to displace said rollers operable from the exterior of said valve body such that said tension band continuous portion can be positioned over said outlet port to close the valve, and such that said tension band continuous portion can be positioned to uncover at least a portion of said outlet port to permit at least a limited fluid flow through said valve.

* * * * *